(12) United States Patent
Lindner

(10) Patent No.: US 6,223,855 B1
(45) Date of Patent: May 1, 2001

(54) DEVICE FOR DISMANTLING VEHICLES, IN PARTICULAR FOR DRAINING THE LATTER

(75) Inventor: Anton Lindner, Nussdorf am Inn (DE)

(73) Assignee: Itochu Corporation, Osaka (JP)

( * ) Notice: Subject to any disclaimer, the term of this patent is extended or adjusted under 35 U.S.C. 154(b) by 0 days.

(21) Appl. No.: 08/836,069

(22) PCT Filed: Oct. 12, 1994

(86) PCT No.: PCT/DE94/01220

§ 371 Date: Jul. 7, 1997

§ 102(e) Date: Jul. 7, 1997

(87) PCT Pub. No.: WO96/11835

PCT Pub. Date: Apr. 25, 1996

(51) Int. Cl.[7] .................................................... E04G 1/00
(52) U.S. Cl. ........................................ 182/131; 137/234.6
(58) Field of Search ..................................... 182/130, 132, 182/113, 131, 179.1; 137/234.6

(56) References Cited

U.S. PATENT DOCUMENTS

| 4,492,501 | * | 1/1985 | Haney | 182/131 |
| 4,572,328 | * | 2/1986 | Benko | 182/113 |
| 4,919,230 | * | 4/1990 | Langer | 182/186.8 |

FOREIGN PATENT DOCUMENTS

9207315 * 10/1992 (DE).

* cited by examiner

Primary Examiner—Alvin Chin-Shue
(74) Attorney, Agent, or Firm—Hogan & Hartson, LLP

(57) ABSTRACT

The present invention concerns a device for dismantling vehicles, in particular for draining the latter. The device comprises, on pillars (30), a framework on which the vehicles are placed and inspection-type work platforms (40, 50, 60, 80, 90) which can optionally be pivoted to the side. At least one tank-emptying module and/or at least one liquid-collection module and/or at least one liquid-extraction module are provided on the framework.

28 Claims, 11 Drawing Sheets

DEVICE FOR DISMANTLING VEHICLES, IN PARTICULAR FOR DRAINING THE LATTER

The current invention pertains to a device for dismantling and especially draining vehicles, with the characteristics described in Patent Claim 1.

In the Federal Republic of Germany alone, approximately 2.6 to 2.8 passenger cars are scrapped annually. In the next 10 years, this amount is expected to increase to 3.2 to 3.5 million vehicles per year. Currently, the vehicles are taken over by scrap recyclers who remove usable parts and transfer them to the used parts market. The dismantled vehicles are fed into raw material merchants' shredders after drainage of operating fluids. The above mentioned invention provides a device to be used to drain operating fluids as well as to remove usable parts.

Patent DE-U-92 07 315.8 proposes a scaffold-like disposal ramp to drain old vehicles consisting of a square superframe supported at its four corners on columns at head height. The work ramp at the rear longitudinal side of the superframe has a rear work ramp with a rigid railing.

The disposal stage of this design has the disadvantage that the railing is in the way and could be easily damaged or even destroyed when the scrap vehicle is conveyed onto it by a forklift or a crane. This flaw has a severe adverse effect on the time required to set up and position the old vehicles and the turnover and profits of the plant as well as on workplace safety.

Patent DE-A41 10 419 describes a square mobile disposal container with two lateral working platforms attached on the outside to the longitudinal container sides slightly above the ground.

To avoid exceeding the allowable width for street transports, the two lateral working platforms can be swiveled downward and the detachable railing can be removed. On the lateral work ramp, another detachable railing is installed.

A disposal ramp of this type has the disadvantage that the placement of the attachable railing parts in the corresponding slots as well as the attachment of the railing itself is time consuming, work intensive and contains the possibility of risk of injury. In addition, the loose railing parts may be easily lost, or attaching the railing may be omitted through negligence or laziness. This is of particular concern as regards safety.

Another state of the art device for dismantling vehicles is available which consists of a rectangular frame for positioning vehicles. To catch the dripping fluids, a wide beam-like receptacle tub which runs across the stand is moved under the fluid drain opening by shifting the frame in a longitudinal direction.

The disadvantage of this device is that the movable beam-like receptacle tub is much larger than necessary and presents a significant obstruction in the head area beneath the working platform.

Instead of a movable beam-like receptacle tub, movable metal containers with rigid, funnel-shaped catching devices are also available and can be placed under the fluid drain opening. Such drain pans have the disadvantage that they put great stress on the surface capacities of the driving floor. When lightly loaded and placed on an uneven floor, they require great effort to move and are in constant danger of tipping over. They also limit one's range of motion in the foot area under the work platform.

Another state of the art device for dismantling vehicles is one that uses four individual lifting units instead of a positioning frame supported by legs. The real disadvantage of this device is that the four lifting units must be repositioned and anchored anew to accommodate the length of each new vehicle to be dismantled. This results in a substantial time expenditure. Moving the lifting units presents coordination problems between draining und removal technology. Sophisticated electronic controls are required for the synchronous up and down motions of the lifting units. Their failure would certainly lead to fatal consequences for the vehicle and possibly the user. Sudden leaks in the hydraulics system would represent a significant safety risk in this regard.

All existing devices for draining vehicles on an elevated frame for holding the vehicle have the additional disadvantage that the upper body and the motor may not be dismantled while work is in progress on the underside.

This latter disadvantage is not common with traditional pit-type indentations or lubrication holes. However, underground work pits have the disadvantage that they are very narrow due to the small wheel base of most vehicles. There is no room for multiple drain receptacles or suction devices and they deprive the operator of freedom of movement. In addition, regulations require that the pit be completely oil tight and as a result they are very expensive to construct. When draining vehicle fuel, fuel vapors, which are heavier than air, can be released and accumulate in the pit. These fuel vapors pose a significant health risk and can form an explosive gas mixture. For this reason, electric tools such as pumps or tools that generate sparks during operation cannot be used in work pits.

The objective of this invention is to design a device for dismantling vehicles and in particular draining them which permits an especially fast and flawless placing and lifting of the junk car on and off the work surface, respectively, with a forklift and allows a high junk vehicle throughput; eliminates the risk of damaging the railing on the front of the work platform when placing and lifting a junk vehicle by means of a forklift ensuring occupational safety; does not endanger the operators by reducing work place safety; provides optimum head room and freedom below the vehicle as well as easy access; permits work simultaneously at the bottom and the top of the vehicle; avoids accumulation of explosive gas mixtures; assures functionality even with an inferior floor surface; is equipped with fluid catchers which can be placed effortlessly beneath the fluid drain openings of the vehicle; requires no change of the support elements when the vehicle type is changed; requires no adjustment of the removal technology for various vehicle types; requires no sophisticated electronic controls, operates at the highest safety level neither endangering the operator's health nor posing a risk of accident; and is cost effective to produce.

These objectives have been met with the prototype device possessing the characteristics shown in Patent claim 1. Particularly desirable characteristics are the subject of subclaims.

A complex representation is provided in grater detail with the aid of the figures.

Figure 1:
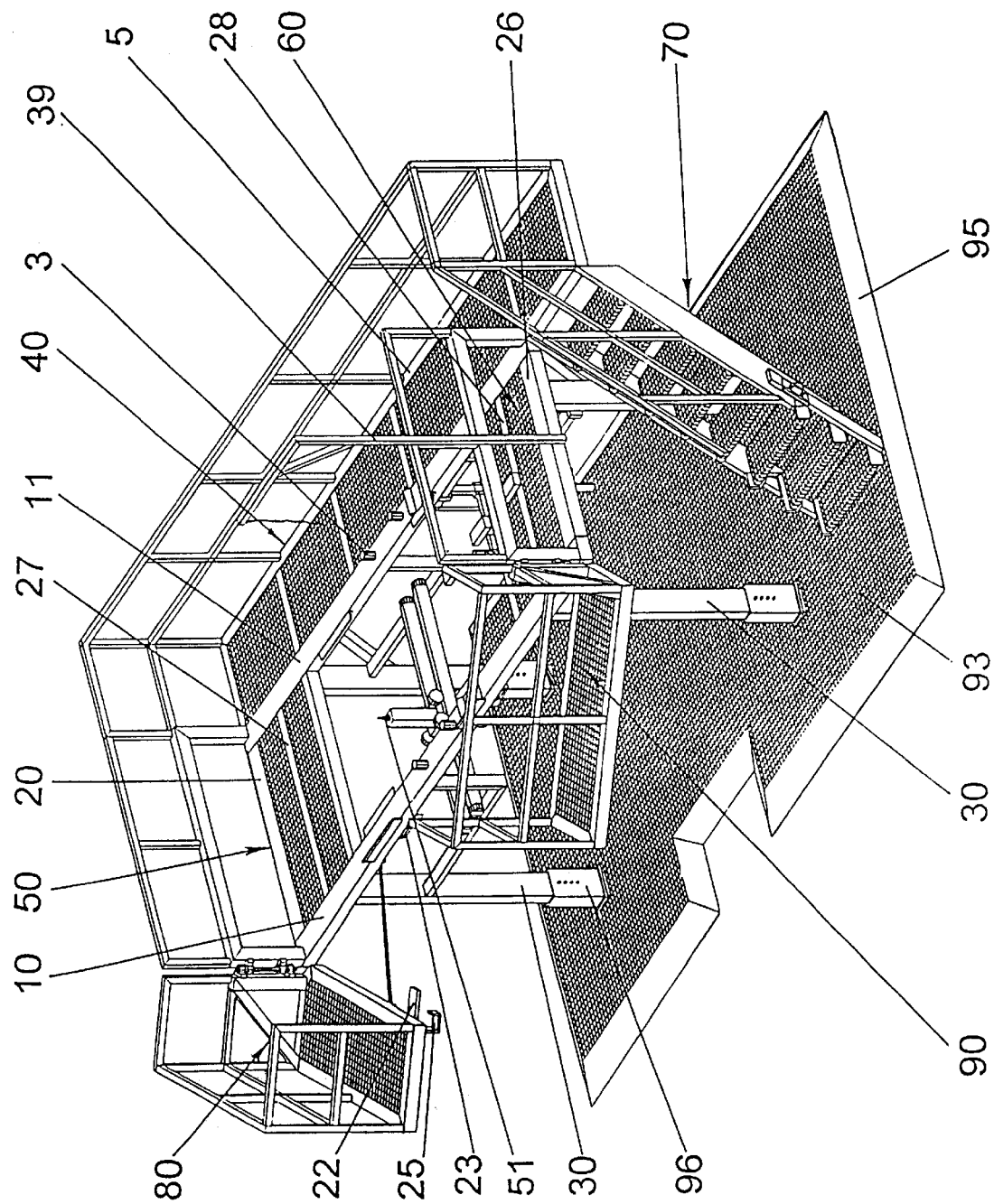
FIG. 1: a schematic, perspective front view of a half-opened device viewed on the right diagonal from above.
Figure 2:
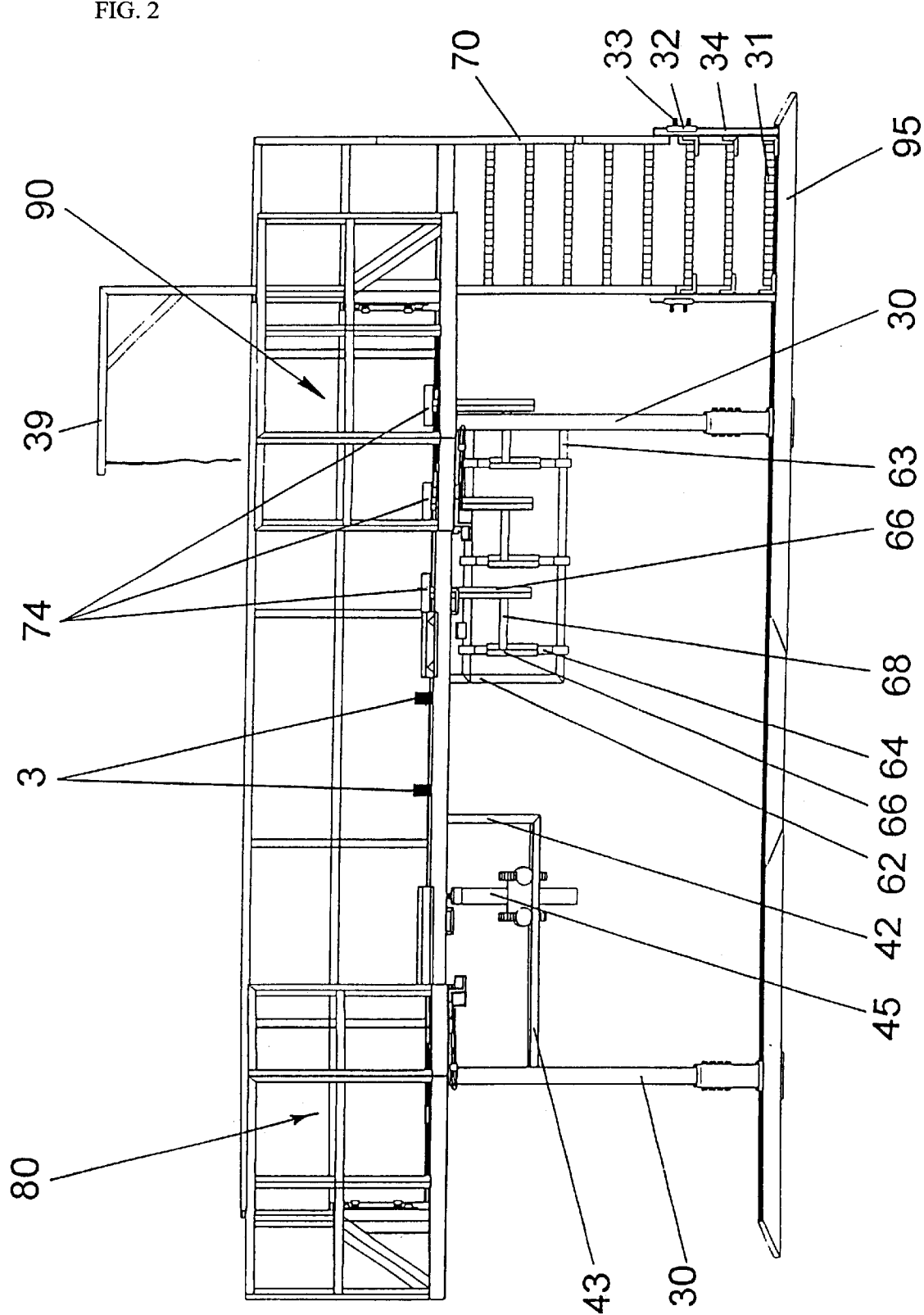
FIG. 2: a schematic front view of a half-opened device.
Figure 3:
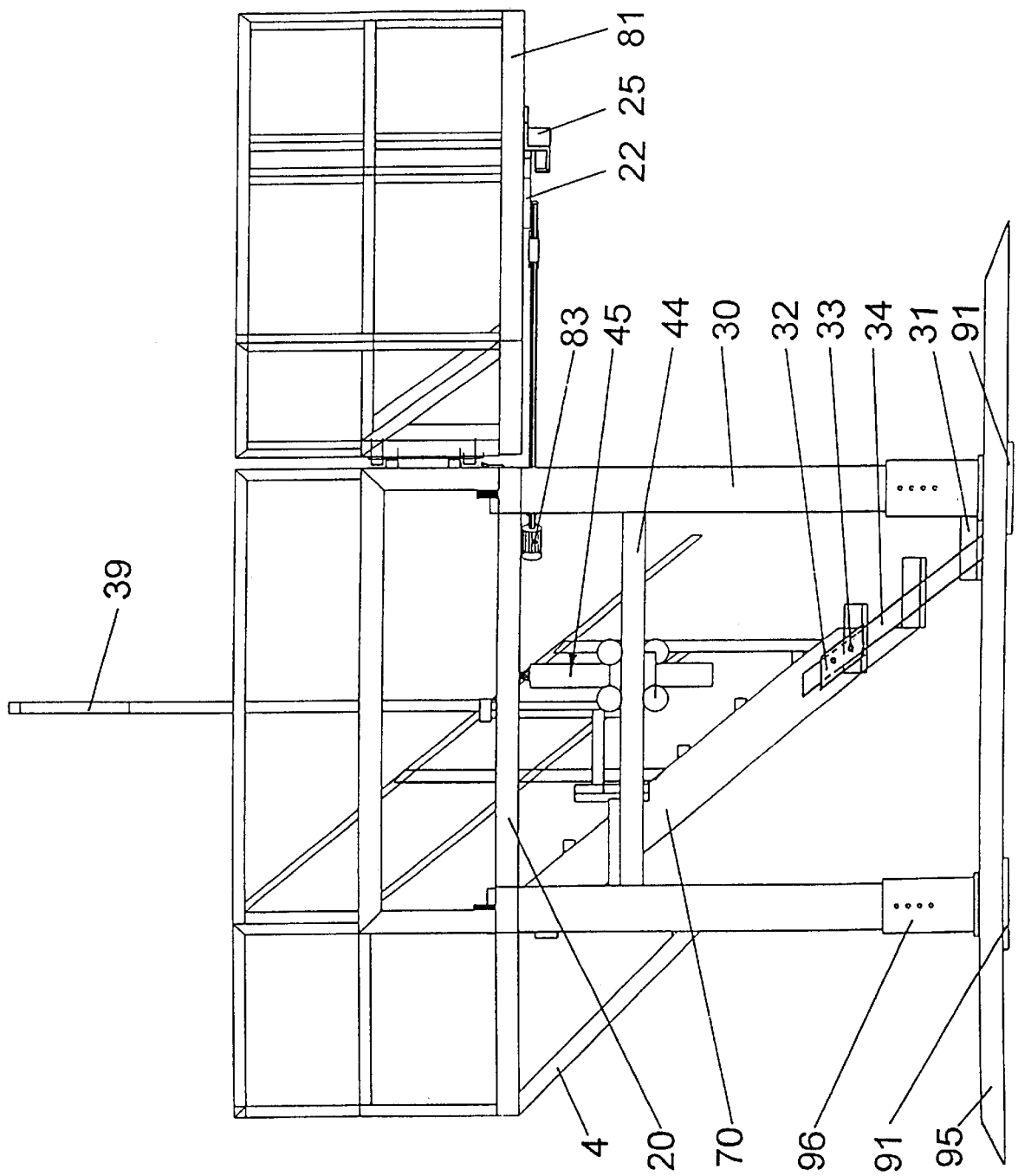
FIG. 3: a schematic left side view of a half-opened device.
Figure 4:
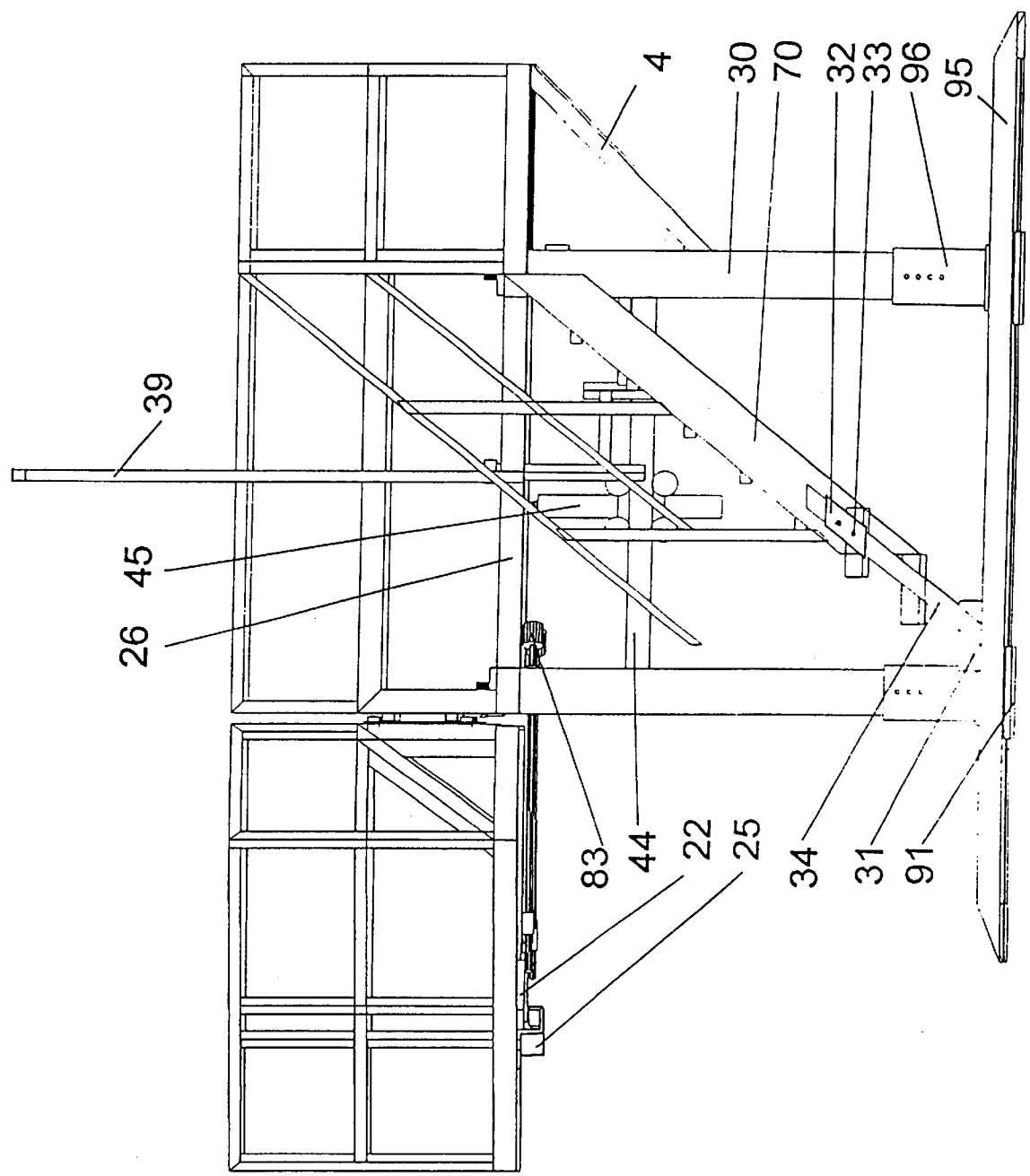
FIG. 4: a schematic right side view of a half-opened device.
Figure 5:
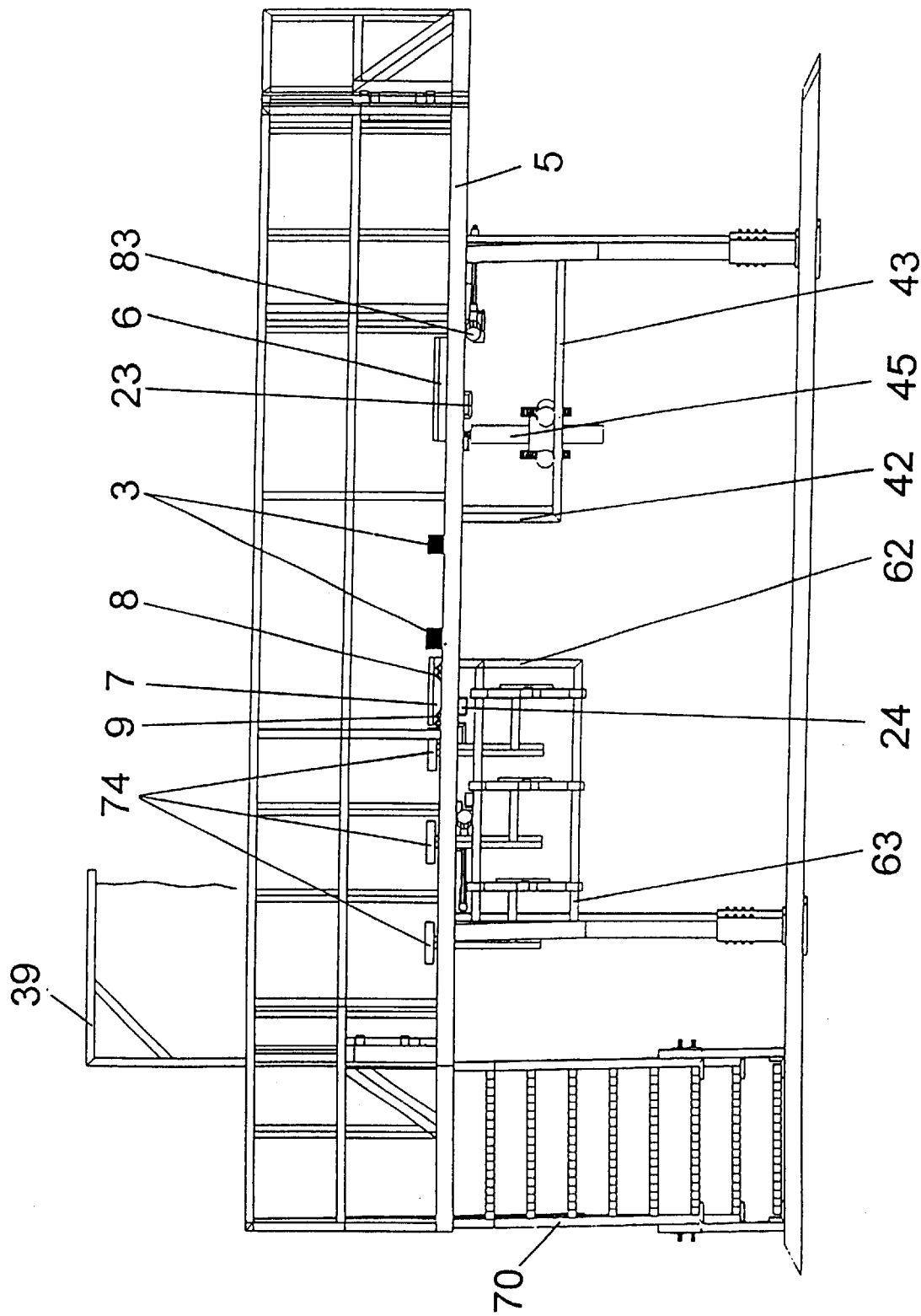
FIG. 5: a schematic view of the back of a half-opened device.
Figure 6:
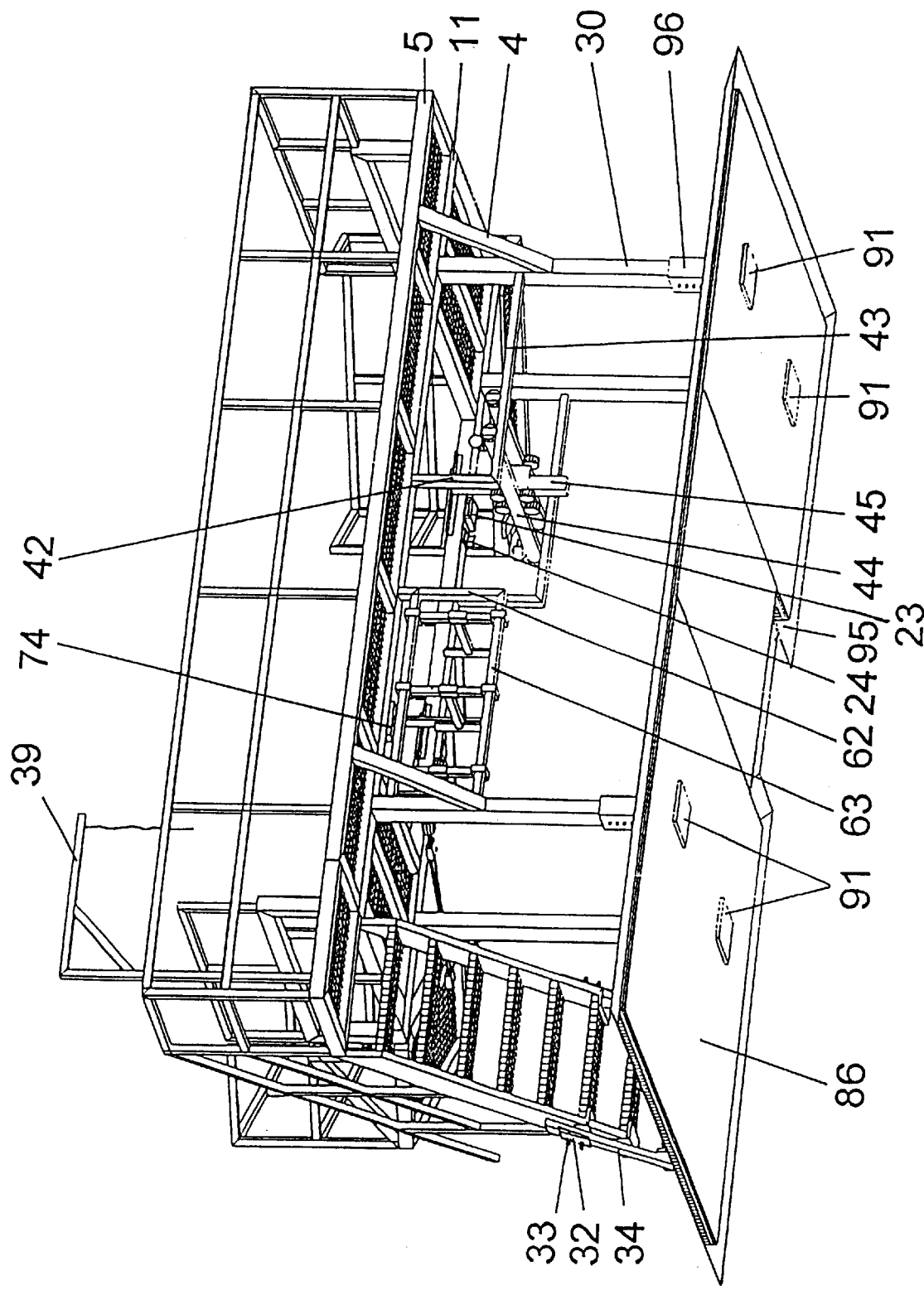
FIG. 6: a schematic perspective view of the back of a half-opened device.
Figure 7:
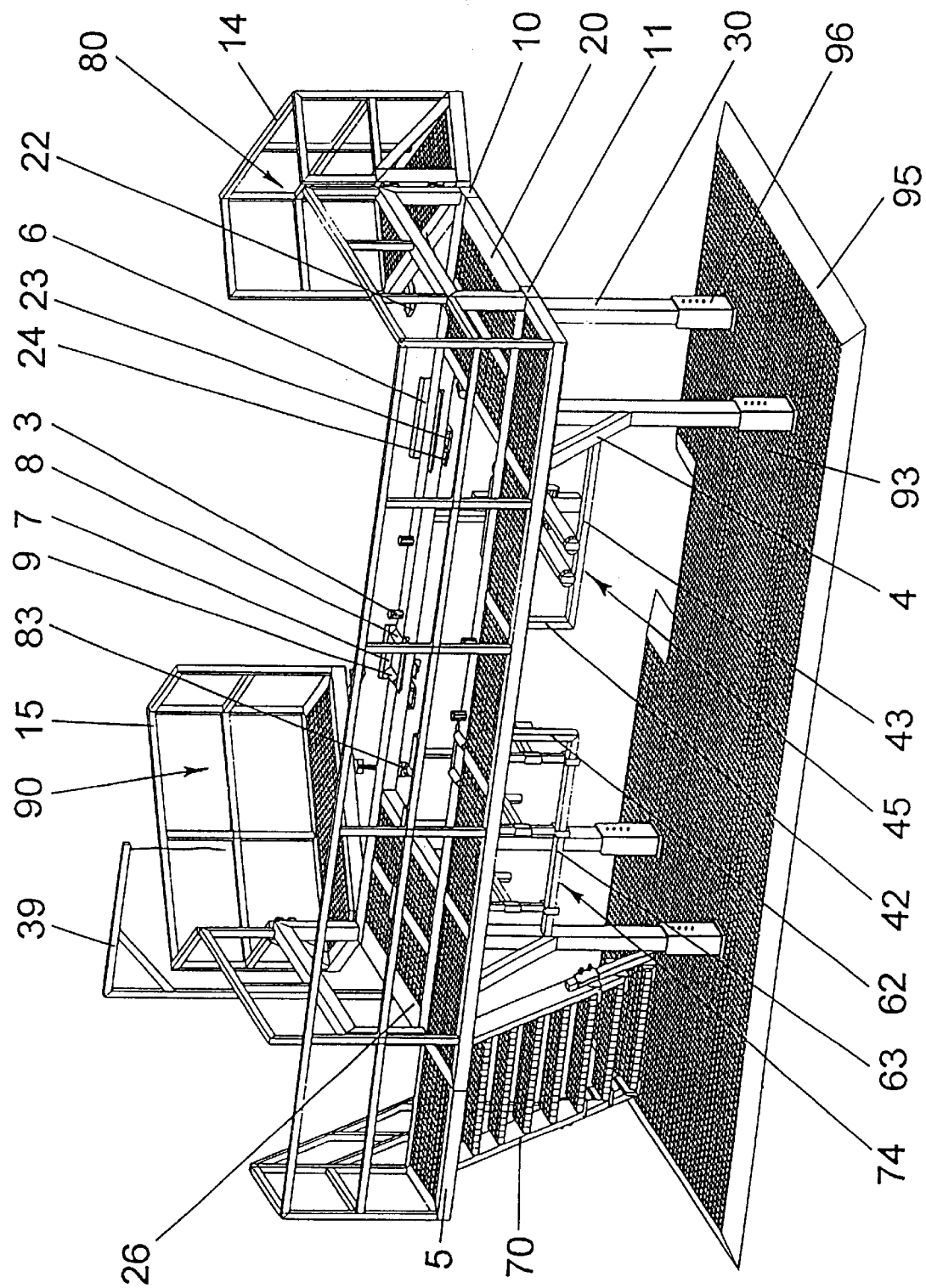
FIG. 7: a schematic perspective view of the back of a half-opened device viewed on the left diagonal from above.

Two longitudinal struts (10,11) are arranged parallel to each other and horizontally. Attached to the ends of the longitudinal struts (10,11) and at a right angle to them, are left and right diagonal struts (20,26). At the bottom sides of all four end areas of the longitudinal struts (10, 11), a foot (30) is attached. These feet provide a space between the rectangular frame formed by the longitudinal (10,11) and the diagonal struts (20) and above the floor (92). In this manner, the frame forms the outer and upper borders of an inner work area.

Inside and/or outside this horizontal frame are walkable work platforms (40,50,60,80,90). They permit the vehicle placed there to be dismantled while it is drained. Thus, the economical usefulness of the device is augmented.

It is possible to walk upon the work platforms on permanently installed or removable grates. Tile-like plate covers with slip-resistant coatings can also be used. If necessary, the struts for holding the walkways can be supported by diagonal struts (4) starting from the feet (30). To minimize the danger of accidents, the work platforms (40,50,60,80,90) as well as the access points (70) are protected on the outside by railings (14,15).

In an especially desirable embodiment, the work platforms are arranged as follows:

Parallel to the rear longitudinal strut (11) is a (seen from above), walkable rectangular work platform (40); parallel to the left external diagonal strut (20) is a walkable rectangular work platform (50) facing the inner work area, and parallel to the right diagonal strut (26) is yet another rectangular work platform (60) also facing the inner work area.

A front-facing walkable rectangular work platform (80, 90) is arranged over the front longitudinal strut (10). This front work platform can be made in one piece or two pieces. Preferably it consists of two work platforms, which are laterally separated (80, 90).

Access to the walkable work platforms (40,50,60,80,90) is provided by at least one ascent (70). For reasons of safety, especially emergency exits, ascents (70) should be connected to the walkable work platforms. For example, an ascent (70) can be installed at each work platform. Preferably a stair ascent should be installed at one of the lateral or rear work platforms.

In the most desirable prototype of the invention, the rear work platform (40) would rise above the right lateral work platform (60). At the point where the rear work platform protrudes laterally (40), a stair ascent could be installed in any position. For example, the stair ascent could (70) be mounted so that the longitudinal axis of the ramp (70) would run parallel to the lateral diagonal strut (26) alternatively toward the front, the rear or in a right angle to it.

Especially desirable would be to install the staircase (70) so that its longitudinal axis would run parallel to the diagonal strut (26), allowing it to incline towards the front and attaching it to the front part of the lateral protrusion of the rear work platform (40).

A corresponding placement of the staircase (70) would be possible if the rear work platform (40) overtopped the left work platform (50) laterally.

The feet (30) could be height adjustable to allow variation for the body size of the operator. To adjust the staircase (70) to the different spaces between the device frame and the floor, the staircase (70) is, for example, mounted to the corresponding work platform (40,50,60,80,90) with a pivot joint which can swivel up and down and may be supported at its lower end by wheels.

Alternatively, the staircase (70) can be installed rigidly at the desired work platform and the lowest step or stair tread (31) made height-adjustable along the longitudinal axis. For example, the lowest step or stair (31) has a rod or pipe-like extension (34) pointing upward and mounted parallel to the longitudinal stair axis. This extension forms a runner (32) with a U-shaped cross-section and can be vertically moved. The sides of this U-shaped runner are attached to the outside surface of the ascent (70). The extension (34) can be held rigid in the runner (32) with a locking screw.

The length of the parallel longitudinal struts (10,11) and thus the length of the diagonal struts (20,26,27,28) is from 0.90 to 4.0 m, preferably 1.0 to 2.5 m or 1.4 to 2.0 m. This length corresponds to the width of the vehicle's wheel base. The length of the longitudinal strut (10) is approximately 4.0 to 10.00 m, preferably 5.0 to 8.0, particularly 5.5 to 7.0 m.

A vehicle is placed on the frame so that its longitudinal axis runs parallel to the longitudinal struts (10,11). The vehicle front may point either to the right or to the left.

As an example of both possibilities, an embodiment of the invention is described below where the front of a vehicle positioned with the motor in front and gas tank in the rear points to the right.

In the case of a vehicle with the motor in the rear and the tank in front, its front end should point to the left as in the following example.

Each longitudinal strut (10,11) is equipped with at least two guide bumps (8,9) to allow the exact placement of a vehicle on the longitudinal struts (10,11) in a lengthwise direction. In principle, seen from the front of the device, guide bumps are installed on the left and/or right half of the longitudinal struts (10,11). To accommodate different vehicle lengths, the guide bumps should only be mounted on one half of the longitudinal struts (10,11).

The guide bumps (8,9) are preferably strips mounted at a right angle to the longitudinal struts (10,11) and have a cross-section resembling an upside down "V". The guide devices (8,9) are arranged closely enough to each other that they enclose the same wheel. Generally they are at a distance of 10 to 80 cm, preferably 30 to 70 cm or 40 to 50 cm from each other.

The centers of the right and the left guide bumps (8,9) are at such a distance from the right walkable work platform (60) so as to prevent the front of a properly placed vehicle pointing to the right from significantly overtopping the right working platform (60) but rather is freely accessible from below. The center between the devices (8,9) is therefore 0.2 to 2.0 m, preferably 0.3 to 1.5 m or 0.5 to 1.0 m distant from the inner edge of the lateral work platform (60).

The areas of the longitudinal struts (10,11) where the vehicle wheels come to rest are widened and extending into the direction of the inner work area. These are generally L-shaped devices attached at one side of the vertical longitudinal strut surface (10,11) facing the inner work area and the free side pointing in the direction of the inner work area.

The widening devices allow for adjustment of the prototype to different vehicle track widths.

In both areas of the front longitudinal strut (10) where the vehicle wheels could come to rest, so-called strip devices (6,7) are attached. Essentially, the strip device is a rectangular plate attached nearly upright to the upper surface of the front longitudinal strut (10) and its longitudinal axis runs near and parallel to the front upper horizontal edge of the front longitudinal strut (10). The strip devices (6,7) facilitate the placement of a vehicle on the frame with a forklift by providing an exact orientation as a locating aid. They also have the advantage that the forklift when withdrawing the fork from under the vehicle does not accidentally pull the vehicle off the frame because the wheels resting on the front longitudinal strut are guarded by the strip devices (6,7) even when the fork of the forklift is withdrawn from beneath the vehicle, providing the vehicle is not yet completely positioned. If the fork of the forklift is withdrawn from beneath the vehicle before the complete placement of the vehicle, but while the vehicle is still partially lying on the fork, the right front and the right rear wheels will come into positive contact with the strip devices. In this manner, positioning the vehicle too far in the back in the direction of the longitudinal axis (11) is prevented. Should this happen, it would have the fatal consequence that only the left front and rear wheels and not the right front and rear wheels would be correctly aligned to the strut device.

Finally, the strip devices (6,7) assure vehicle placement exactly parallel to the longitudinal struts (10,11).

The front work platform (80,90) is particularly important for the design of the invention. The following explanations also pertain to the two lateral work platforms (50,60) and for the rear work platform (40).

The front work platform can be formed in one piece and extend along the total length of the front longitudinal strut (10). In a perfect embodiment of the device as visualized by the plans, it is rigidly attached to the front longitudinal strut (10). According to the design, when the vehicle to be dismantled is placed on the frame of the device with the aid of a forklift, the forklift could be obstructed by the railing. If the forklift has only a short fork or is not heavy, it cannot raise a vehicle to the placement frame of the device over the work platform. (In this case, a heavier forklift and a front platform railing designed to be folded would be required. Otherwise, a crane or a crane trolley could be used).

For these reasons, it is best to design a continuous front platform consisting of one piece which can be removed or swiveled, respectively. It is important that the swivel motion should be to the side and downward. In an optimum prototype, the one-piece front work platform is swiveled to the side with a laterally attached pivot joint.

When the continuous front platform is built to be strong and massive, it has significant weight. This can cause the pivot joint to be so springy that the front working platform may incline to the side and/or vibrate. The swivel action may be rather space consuming in this case.

For this reason, it has proven advantageous to use two separate swiveling work platforms instead of a single one extending over the total length of the front longitudinal strut (10). Its weight is then distributed over two pivot joints resulting in better stress resistance of the device according to the invention.

The front work platform (80,90) can be swiveled with lateral pivot joints attached at the left and right horizontal supports (12,13) to be mounted on the top side of the front longitudinal strut ends (10). The length of the two front work platforms (80,90) can be assigned so that they almost touch each other when they are swiveled out. Since the front working platforms are used primarily for draining and wheel removal of either the front or rear vehicle part, respectively, the distance between them can be much greater.

The swivel process can be accomplished manually or with the aid of electric, hydraulic or pneumatic devices (83). If the swivel action is performed manually, the front platform could easily be swiveled too forcefully to the side. In such a case, the swiveling work platform could strike one of the outer diagonal struts (20,26) so hard that it swivels back. To avoid the risk of accident due to the return swivel action, an elastic stopper as well as an additional braking device are employed. A horizontal metal strip inclining somewhat forward is used as a brake. This strip is attached to the outside of the outer longitudinal strut (20,26) and parallel to it so that it overtops the front longitudinal strut in a frontal direction and so that its front end comes to rest just below the height of the outer diagonal strut of the front work platform. When the front work platform is swiveled aside, it contacts the elastic brake device causing most of the kinetic energy to be absorbed by the front work platform. An elastic stop attached to the rear end of the brake device absorbs, if necessary, the remaining kinetic energy of the front work platform. After the front work platform comes to a halt, it is stopped by the brake device and prevented from swinging back. A separate locking mechanism for the open position of the swiveling front work platform is therefore not necessary.

In contrast to electronic driving devices, pneumatic drives are preferred since they do not generate sparks and do not pose the risk of igniting freed fuel vapors. For this reason, it is clear that pneumatic or hydraulic drives are preferable for all devices with regard to this invention. The use of exclusively pneumatic or hydraulic devices will meet future regulations currently under discussion.

For swiveling, a pneumatic servomotor (83) is, for example, attached to the bottom side of the longitudinal strut (10) some distance from the pivot joint and can be swiveled horizontally. It has a spindle-like extension which extends in the direction of the work platform. On the bottom of the back longitudinal strut (82) of the front work platform (80,90) is an essentially pipe-like, swiveling guide with an interior thread on the side opposite the drive (83). The spindle-shaped extension of the drive (83) extends into the guide and closes or opens, respectively, the front work platform depending on the rotation direction of the servomotor. Additional safety devices which detect resistance during opening and closing and that cause the servomotor to stop when resistance is detected, can be installed.

Figure 8:
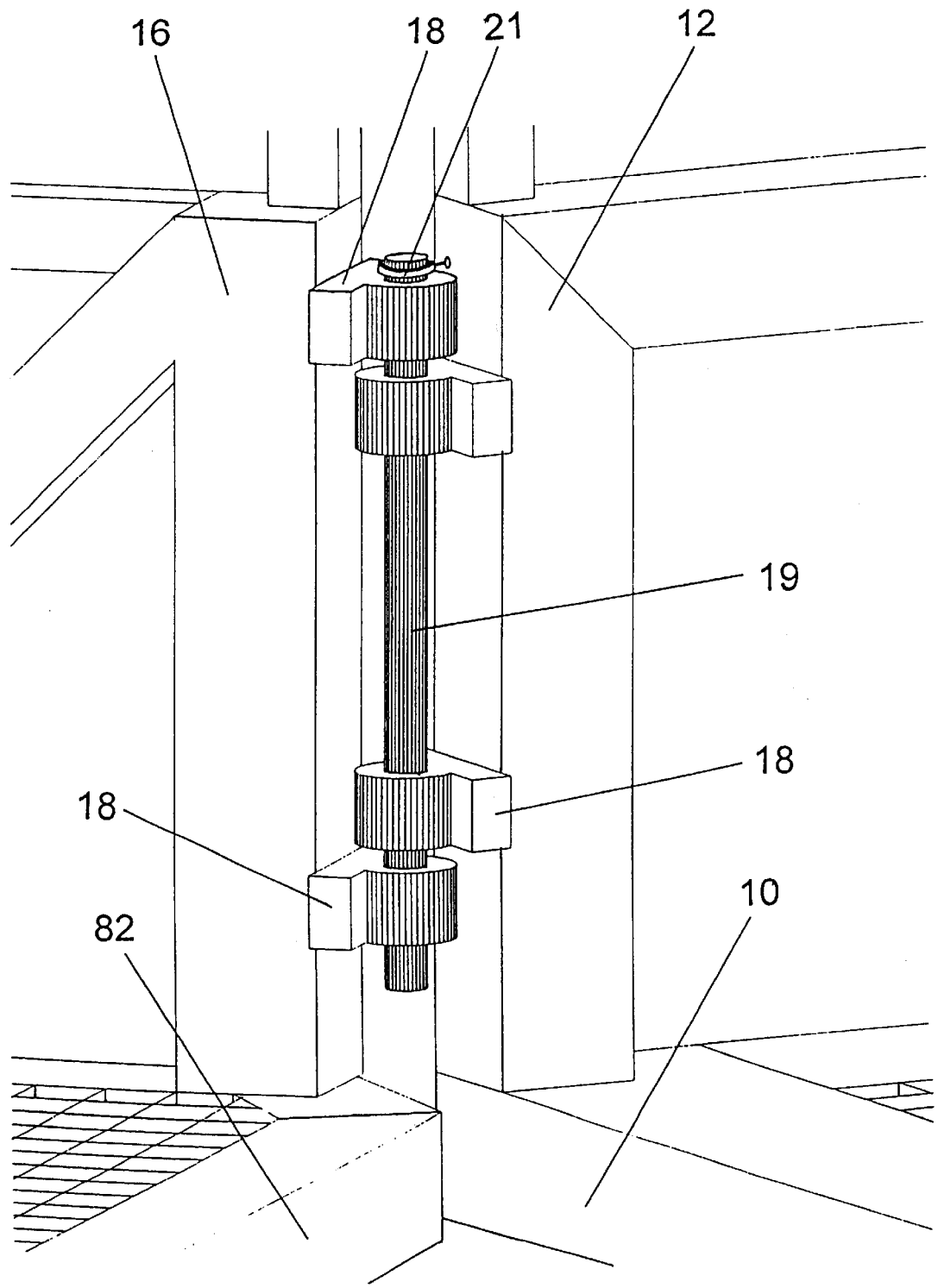
FIG. 8: a schematic view of the pivot joint between a swivel-front work platform and the frame of the device.

The swiveling pivot joint connection is designed as illustrated in FIG. 8. Two vertical supports (12,13) are attached to the front longitudinal strut (10) at its outer ends. Each support (12,13) carries at least two fixed-pivot swivel brackets (18). At the lateral rear corners of each of the two front work platforms (80,90), vertical supports are attached (16, 17). They each have at least two vertically stacked fixed-pivot swivel brackets (18).

The fixed-pivot swivel brackets on the supports (12, 13;16,17) are preferably attached in a vertical direction so that first-beginning on top-a fixed-pivot swivel bracket for the frame support (12,13) is followed at a minimal distance by the upper fixed-pivot swivel bracket for the work platform support (16,17). A second fixed-pivot swivel bracket for the frame support can be installed immediately under the upper fixed-pivot swivel bracket of the work platform support. Next a gap is selected based on the support lengths (12,13;16,17). This gap is followed by another fixed-pivot swivel bracket of the frame support (12,13, then followed by a fixed-pivot swivel bracket of the work platform support. A special distortion resistance is attained when the lower fixed-pivot swivel bracket of the platform support is surrounded by another fixed-pivot swivel bracket of the frame support.

The fixed-pivot swivel bracket (18) of the frame supports (12,13) and the work platform supports (16,17 are arranged vertically so that they intermesh. A shaft (19) extends vertically through each fixed-pivot swivel bracket connecting all fixed-pivot swivel brackets in a non-positive manner. An arresting ring (21) with a locking screw, preferably at the upper shaft end (19) prevents the shaft (19) from sliding down out of the fixed-pivot swivel bracket (18). Each fixed-pivot swivel bracket (18) contains a traditional bearing, such as a sliding, ball or roll bearing to accept the shaft (19).

To assure an absolutely horizontal and non-elastic direction for the front opening work platform (80,90) a bumper shoe (23) and a tongue-shaped protrusion (22) can be attached.

On the bottom side of the front longitudinal strut (10), a bumper shoe (23) is placed as far forward as possible. Seen from above, it has a square base and, seen from the front, a generally U-shaped cross section. The free ends of the U are attached at the common side of the longitudinal strut (10). The longitudinal axis of the bumper shoe (23) is at a right angle to the longitudinal axis of the longitudinal strut (10).

A tongue-shaped protrusion (22) is attached on the underside of the rear strut (82) of the front work platform (80,90) equidistant from the pivot joint. It overtops the rear strut (82) to the rear and is formed so that the rear strut (82) meshes positively into the bumper shoe when the work platform is swiveled.

To relieve the drive (83) in swivel position and to avoid an accidental swivel action, a mechanical, electric, magnetic or pneumatic locking mechanism (24,26) may be used for locking and unlocking the swiveled front platforms (80,90). This can be, for example, a trap (24) in the shape of a downward hook that meshes into a bolt with a notch or an upward bending locking element (25).

A metal piece (25) bent upward at a right angle when seen from the side and overtopping the rear strut (82) toward the back is preferably attached to the underside of the inner end of the rear strut (82) of the front work platform (80,90). A trap (24) is attached equidistant from the pivot joint at the underside of the longitudinal strut (10). The trap (24) resembles a lying "L" when seen from the side; its front short side is aligned vertically downward, and its rear longer side horizontally and generally parallel to the underside surface of the longitudinal strut (10). The longitudinal axis of this L runs is at a right angle to the longitudinal axis of the longitudinal strut (10). The L-shaped trap is attached at its rear end for swiveling vertically. If the trap (24) is made of metal, it can, for example, be lifted by activating an electromagnet, accessing the locking element (25). However, a pneumatic lifting device is preferred for the reasons given above. If the vertical part of the trap (24) is shaped like a lying "L" with a corresponding slant, the locking element (25) will independently find its way into the trap (24) without activating the trap lifting device.

The locking mechanism (24,25) can also be connected to a lighting trough emitting a light or sound signal when the locking mechanism is not closed. This prevents careless ascent onto the front work platform when it is unlocked and unsafe.

As discussed above, the work platform consisting of one or several parts can also be connected rigidly to the front longitudinal strut (10). A prototype such as this can be advantageous when vehicles are placed on the frame of the device by a crane or a trolley according to the invention.

If a prototype of a continuous one-piece front work platform is to be serviced by a forklift, it must be a heavy model with long forks. The forklift can only drive up to the front horizontal strut (81) of the front work platform and not up to the front longitudinal strut (10) of the frame.

In such case, the railing (14,15) should be removed so that it is not destroyed by the forks of the forklift during placement of vehicles. With this in mind, the front and the two side railing parts are installed, for example, with the aid of pivot joints that can swivel vertically at the horizontal struts of the front work platform. By removing the locking pins extending through vertically stacked loops from adjacent railing parts, the railing parts can be detached from one another and swiveled down individually. For the swivel action, pulleys or electrical, hydraulic or pneumatic devices can be used. It is self-evident that for railing removal all pivot directions, especially those toward the side, can be used.

Besides the prototype made with a continuous front work platform attached rigidly to the front longitudinal strut (10), another prototype can be produced with two smaller front work platforms which are also attached rigidly to the front longitudinal strut (10) on the side at a distance from each other. It is important here that the selection of the distance between the two front struts be large enough so that the forklift can advance up to the longitudinal strut (10). In this prototype, the forklift lifts the junk vehicle higher than the railing (14,15) of the front work platforms so that the vehicle parts protruding from the side of the fork do not collide with the railing. In this case, it is not absolutely necessary to design the railing parts (14,15) in a detachable or swivelable manner.

However, even in this prototype, the railing parts of the front work platform (80,90) are designed so that they can be detached and laid down. To this end, the process is the same as described with the one-piece continuous work platform. In this manner damage to the railings (14,15) is prevented when the vehicle parts protrude from the fork in an approach that is too slow.

As mentioned above, the feet (30) can be adjusted to allow for the operator's height in several different ways. The height adjustment of the feet (30) and with them, of the frame, is done mechanically. For this reason, the production costs of the device according to the plans are kept low.

Figure 11:
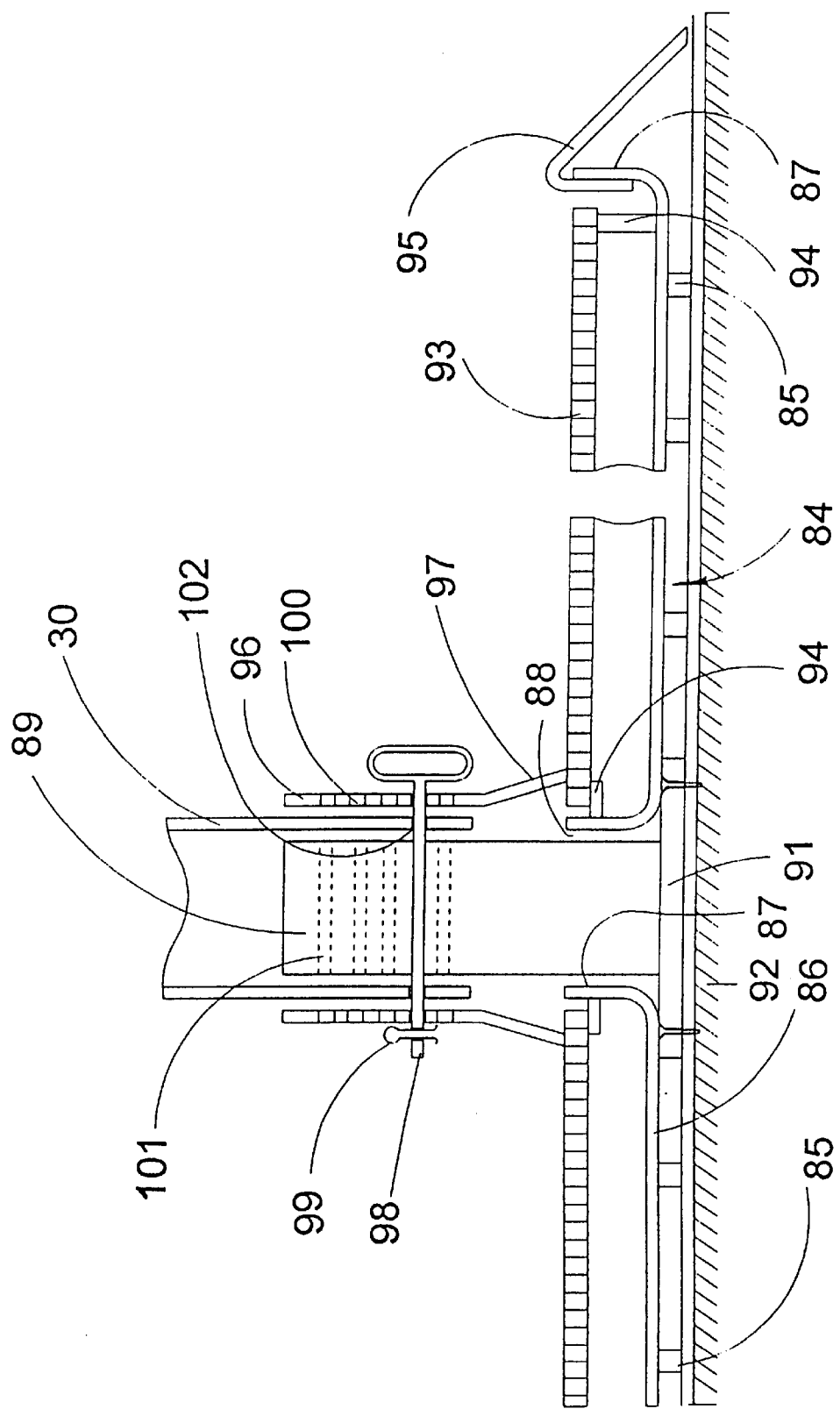
FIG. 11: a schematic view of a basin and the lower foot area.

An exemplary mechanical device for height adjustments is shown in FIG. 11. To anchor the device according to the plans at the ground (92), a horizontal pedestal plate (91) is attached with screws. On the horizontal pedestal plate (91) is a vertical, generally square pedestal element (89). The vertical pedestal element (89) has slightly smaller dimensions, seen from above, than the interior of the foot (30). The vertical pedestal element (89) protrudes into the lower end of the foot (30), and the foot (30) may be moved vertically away from the vertical pedestal element (89). The vertical pedestal element has several horizontal bores (101) parallel to and above each other. In the lower part of foot (30) are two bores (102) at equal height and on opposite sides that align with each of the horizontal bores (101) of the vertical pedestal element (89) each time a vertical movement of the foot (30) occurs. To arrest the foot (30) at a particular height, a locking pin (98) is threaded through the first bore (102) of the foot (30), through any of the bores (101) of the vertical pedestal element (89) and finally through the second boring (102) of the foot (30) and secured with a splint (99).

When the foot is at its lowest position (30), the two foot bores (102) are at the same height as the lower bore (101) of the vertical pedestal element (89) and align with it. A ring-shaped handle on the one side and, on the other side, a splint (99) prevent unintentional removal of the locking pin. By removing the locking pin (98), lifting the foot (30) and reinserting the locking pin anew into the two foot borings (102), the height of the device, according to the plan, can be increased to the operator's height at a minimum cost.

It is certainly also possible with the use of common electric, hydraulic and pneumatic devices to change the height of the foot (30) instead.

The walkable work platforms (40,50,60,80,90) as well as the ramp (70) are each 0.2 to 2.5 m, preferably 0.4 to 2.0 m or 0.6 to 1.5 m wide. For the operators' safety, they are surrounded by a railing-like fence. The walking surfaces, for example, consist of grates or tiles with slip-resistant coating, which are placed in grate or tile frames.

Such walking surfaces are located, for example, between the left outer diagonal strut (2)0 and an adjacent inner strut (27) as well as between the right outer diagonal strut (26) and an adjacent inner strut (28). In order to allow use of the device according to the plans for different vehicle types with very different vehicle lengths, several inner diagonal struts (27,28) are installed by which the distance between each of these additional inner diagonal struts and the corresponding adjacent outer diagonal struts can be bridged by additional removable walking surfaces. For short vehicles, these additional walking surfaces are inserted, and for especially long vehicles they are removed in order to permit optimal access to the vehicle underside.

Walking surfaces of the described type are also used between the back longitudinal strut (11) and a horizontal longitudinal strut (5) the latter running parallel and toward the rear of the former. To prevent exceeding the permissible breadth for street transport, it may be necessary to design the rear longitudinal strut (5) in such a way that it may be removable from the back longitudinal strut (11). To increase the stability of the device according to the plans, especially to support the rear work platform (40), at least one of the back feet (30) runs a diagonal strut (4) extending diagonally upward to the rear longitudinal strut (5).

Grates or flat tile-like walk surfaces are also installed between the front and rear horizontal longitudinal struts of the front working platform (80,90) as well as in the ascent area.

Another special feature of the device according to the plans are at least one, preferably four jack units (3) that permit the lifting of the vehicle placed on the frame. If all four jack units (4) are lifted simultaneously and synchronously, the vehicle is lifted horizontally. When the vehicle is lifted up, the wheels can be easily removed and the shock absorbers dismantled or drained, after drilling at the appropriate place. By asynchronous steering of the jack units (3), the vehicle can be turned on its longitudinal and diagonal axis. This allows the fluids which would remain in the vehicle without this tipping to flow out.

The jack units (3) can, for example, be mounted on the surface of the longitudinal and/or diagonal struts or be partially inserted into them. In both cases, they should preferably be mounted on sleds that can be moved in a longitudinal and/or diagonal direction. The jack units can be placed in such a manner that they touch the wider areas of the vehicle placed on the frame. With very narrow vehicles or a very wide frame, it is easy to connect the two opposite jacks (3) located on two different longitudinal struts (10,11) with a beam extending under the vehicle. By activating the jacks connected via the beams, the vehicle can be lifted up or tipped to the side, respectively, for fluid drainage.

In principle, the jack can be driven in any direction. Because of sparks from electrical motors, hydraulic or pneumatic pistons are preferred. Jacks (3) can also be mounted on the diagonal struts (20,27;28,26) in place of or in addition to the jacks on the longitudinal axes (10,11). In this case, the lifting of a vehicle can also be accomplished with beams extending above the inner work area below the vehicle from one jack to the other.

According to the plans, It is especially important for the device to have at least one fluid catching module and/or a suction module which allows the positioning of a fluid catching device (74) or a connection with a suction unit without any effort and without limiting freedom of movement in any place in the inner work area.

The devices ending with the suffix "module" here and in the following are mutually exchangeable parts of the device according to the plans.

Figure 9:
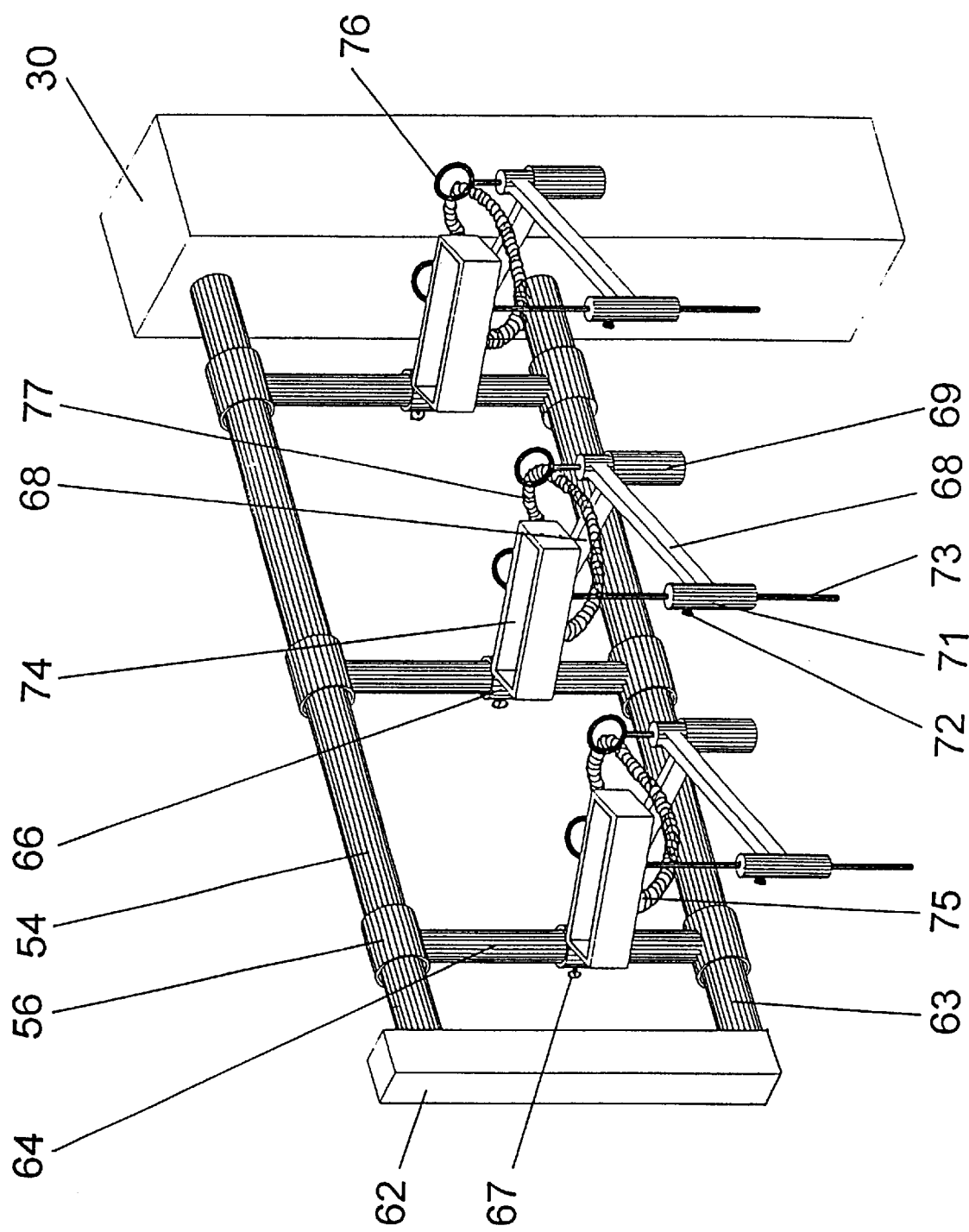
FIG. 9: a schematic perspective view of a horizontally and vertically adjustable fluid catching receptacle.

In an especially desirable prototype, a fluid catcher or suction module is designed as shown in FIG. 9. Such module consists of a sliding frame in the shape of "U" turned 90° to be viewed from the side. It consists of a vertical strut (62), a lower horizontal guide (63) and an upper glide (54) running above and parallel of the former. The horizontal free sides of the U-shaped sliding frame are attached above each other at one of the feet (3) either rigidly or swiveling to the side. The upper end of the vertical area (52) is preferably connected only with the upper horizontal guide (54) and is otherwise free. For reasons of stability it could be attached rigidly to the underside of one end of the longitudinal strut (10,11) or a horizontal diagonal strut (20,27;28,26) In such case, it is not possible to swivel the sliding frame in the shape of a lying "U".

Between the upper guide (54) and the lower guide (83), a vertical slide rod (64) is arranged. The slide rod has horizontally aligned guide tubes at its end (56) which loosely surround the upper guide (54) and the lower guide (63). In this manner, the vertical slide rod (64) can be moved to the side along the upper and the lower guides (54,63) in a sliding or, if needed, rolling motion.

The vertical slide rod (64) is surrounded by at least one vertically aligned guide tube (66). At least one horizontal arm (68) is attached to it. Preferably the vertical guide tube (66) carries two horizontal arms (68) which are connected with each another over a joint (69). The free end of the arm (68) carries a vertically aligned guide tube (71) in which a slide rod (73) runs parallel. At the upper end of the vertical slide rod (73) is a funnel or tub-like fluid catching receptacle (74).

To produce an essentially closed system, the upper rims of the fluid catching device (74) are designed with a continuous edge and/or lip-like cuff made of permanent elastic plastic. When the fluid catching device (74) is properly positioned, this cuff fits snugly against the vehicle underside and prevents the release of vapors. In case a gas-tight connection between the continuous cuff and the vehicle underside cannot be accomplished due to geometric constellations, the upper wall area of the fluid catching device (74) has an opening for the attachment of a hose (77) which is connected to a device generating under pressure. In this manner, the release of vapors during fluid drainage can be avoided with this invention. Instead of the funnel or tub-like fluid catching receptacle (74) or in addition to it, the suction trunk connection of a suction device can, of course, be used.

The fluid catching receptacle (74) or the connection of the suction trunk device are attached over the vertical guide tubes (66,71) and can be moved vertically. To arrest the slide rods (64,73) extending through these guide tubes, the guide tubes (64,73) have locking screws (67,72).

The lateral movability of the fluid catching receptacle (74) or of the connector for the suction device is accomplished by means of the also laterally turnable vertical guide tube (66) and the joint (69).

The fluid and/or the vapors collected are fed out through a hose system (77). The path of the hose (77) is preferably laid out by means of hose guides (76) so that it runs from the hose connection (75) along the arm (68) by the shortest way into a foot (30), into a longitudinal strut (10,11) or into a diagonal strut (20,27;28,26). From there it runs to an underground tank-like container in a separate room in compliance with regulations. If a suction device is used, an installation outside the room in which the dismantling device is located, is employed to supply the hose (77) with underpressure. The suctioned off vapors are released into the atmosphere after passing through a recycling unit and/or a filter.

The hoses (77) are best installed in such a way that hoses containing the same liquids empty into the same waste containers. A separate container storage room could, for example, hold individual containers for gasoline, diesel fuel, motor oil, crankcase oil, steering fluid, shock absorber oil, brake fluid, antifreeze, coolant for air conditioners and window washing fluid.

This prototype of the device as laid out by the plans of a fluid or suction module, respectively, has the advantage that neither hanging hoses on the floor nor fluid-catching receptacles standing on the floor limit the freedom of movement on the floor. Also, the head room is not obstructed since fluid catching receptacles (74) that are not in use can be swiveled completely out of the way. An enormous increase in freedom of movement in the head area can be accomplished because the upper horizontal slide guide (54) and the lower horizontal slide guide (63) are connected to a foot (3) via stopping pivot joints and can be swiveled aside. If the underside needs to be dismantled after draining, the U-shaped slide frame together with the arms (68) and the fluid catching devices (74) can be swiveled completely out of the inner work area.

In an especially exemplary prototype of the device according to the plans, a tank voiding module is used instead of or in addition to a fluid catching module or fluid suction module, respectively.

In the tank voiding module, the actual tank voiding device (45) is arranged on a sliding mount which permits precise placement of the tank voiding module horizontally and vertically under the tank.

Figure 10:
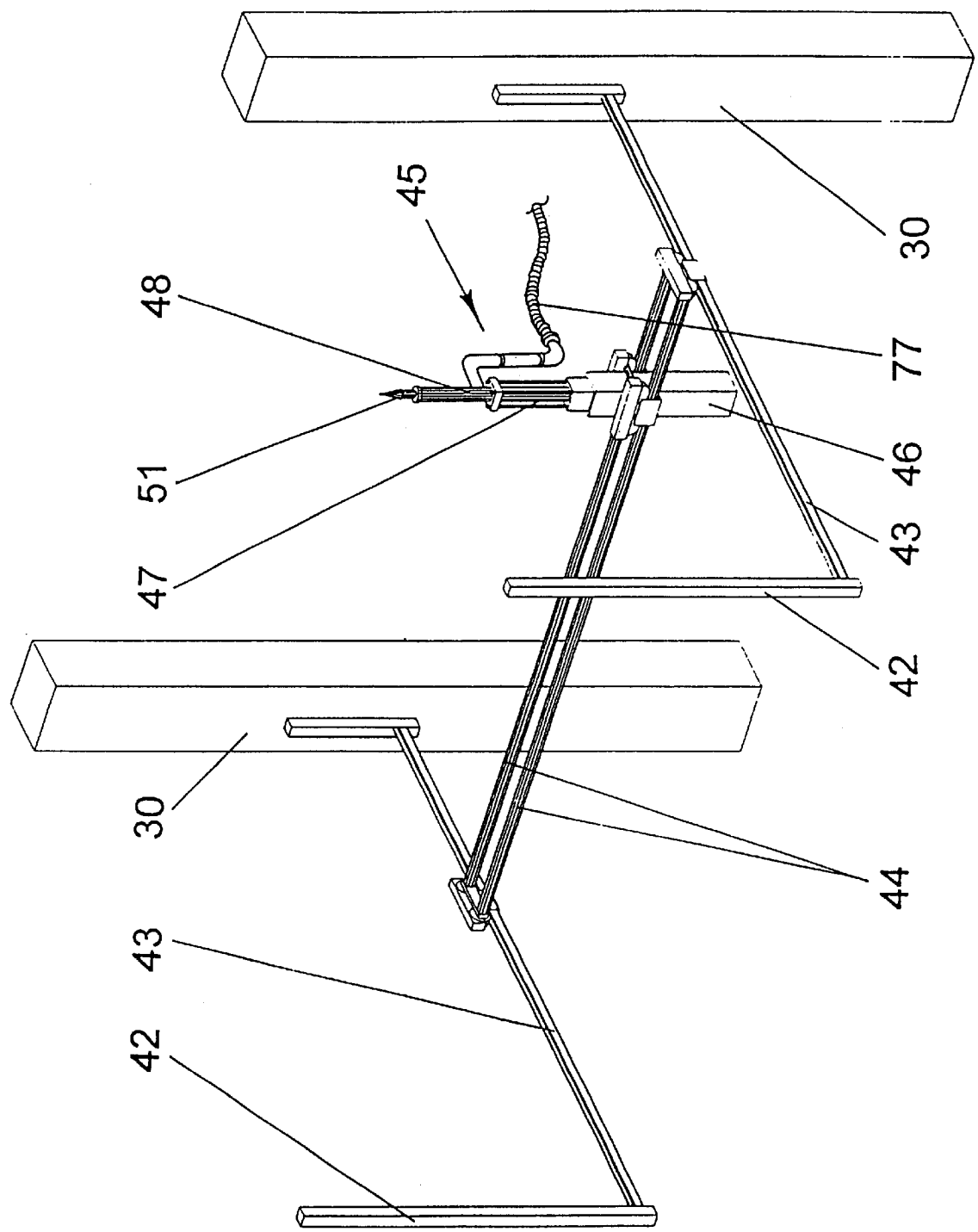
FIG. 10: a schematic perspective view of a horizontally and vertically adjustable tank bore device.

An exemplary embodiment of a tank voiding module is shown in FIG. 10. The sliding mount consists of two horizontal guide tracks (43) at equal height. They are attached parallel to each other and at the same height opposite and parallel to the longitudinal struts (10,11) of two adjacent feet (3). The free end of the horizontal guide tracks (43) can be connected with the longitudinal struts (10,11) of the frame via a vertical strut (42) to increase the tank voiding module stability. Two adjacent, parallel, horizontal slide rods (43) run in a gliding or rolling motion on the guide tracks (43). They are arranged at a right angle to the horizontal guiding tracks (43) and rigidly connected to each other. On a sled which slides or rolls on the two adjacent slide rods, are mounted a lifting device (46) and on it a tank voiding module (45). With the aid of the sliding mount (45), the tank voiding module (45) can be moved in the direction of the x and y axes and positioned precisely under a tank.

The electric, hydraulic or pneumatic lifting device (46) moves the tank voiding module (45) in the direction of the z axis. The lifting device ought to be pneumatic to avoid sparks.

The tank voiding module (45) has a drive (47). In the best prototype, the drive (47) has a rotating shaft pointing upwards and carrying a drill bit (51). With it, a sheet metal tank can be opened from below, the bore hole enlarged and most of the tank emptied.

However, if one of the plastic tanks which are currently being used now are bored, splinters can be generated that could plug the fuel catching device (48), the outlet opening, the hose, or the pump, respectively.

To avoid problems with bore splinters, instead of a rotating drill (51) a pointed mandrel mounted vertically upward on a shaft of the vertically moving drive is recommended. It is especially advantageous when the drive shaft (47) has a chuck to hold the drill bit and the mandrel so that they can be used interchangeably.

The upward motion of the mandrel is best carried out by the lifting device (46) but it can, of course, also be done with an excenter or a gas pressure spring.

After drilling or otherwise opening the tank, the bent edges of the bore hole are bent downward in a funnel shape so that the fuel in the tank can drain completely. This may be accomplished by means of the tank voiding module (45): a number of springy, circular hooks held together by a spring ring which are inserted in the bore hole. When the ring is loosened, the hooks which are springy and facing outward grip into the upturned bore hole edges. The circular hook assembly is pulled downward, and the edges of the bore holes and also, in part, the tank bottom are bent down.

The fuel flowing out of the bore hole is collected in a ring-shaped collecting basin (48) and delivered by hose (77) to the appropriate container, The tank voiding module (45) is preferably designed as a closed system. This means that the upper edge of the ring-shaped catching basin (48) has at least a lip and/or bulge-like cuff which contacts the tank bottom forming a gas-tight seal with the appropriate contact pressure. As in the case of the fluid catching module (74) an additional opening for attaching a steam vacuum device can be arranged in the upper wall area of the catching basin (48).

The advantage of this prototype of the device with a tank voiding module according to the plans is that the fuel can flow almost completely out of the tank because the tank has been opened from below. This is not possible if the fuel is sucked through the tank muff. By bringing the ring-shaped catching basin (48) to the bore opening in the tank the outpouring fuel does not have to travel a long distance to a basin-like catching container. Thus, no fuel vapors are released during the fuel voiding. On the one hand, there is no health risk to the operators and on the other hand, the formation of explosive gases can be avoided with this measure.

In an especially fine prototype, a tank voiding module is attached to a lateral pair of feet (30) (for example, the left front and left back foot in on frontal view). On the opposite two feet (3) (for example, the right front and right back), a fluid catching module and/or a fuel suction module are arranged.

As explained above, fuel vapors can conceivably be released when fluids are removed from vehicles. This is particularly true when a fluid catching module without vapor suction is used instead of a fluid suction module or when an open fuel catching module without vapor suction is used instead of a closed tank voiding module. Since the vapors released are heavier than air, they descend and, according to the plans, gradually fill the room in which the device is located. To remove these unhealthy vapors and a possibly explosive gas mixture, a floor suction plant is installed. Its suction aperture extends along the floor backward and parallel to the rear longitudinal strut (5) across the whole length of the device.

To increase the effectiveness of the ground suction plant, the floor is inclined below the device according to the plans in the direction of the elongated suction aperture of the suction plant. The incline of the floor is 0.001° to 10°. Due to the floor incline, heavy fluid vapors flow quickly and completely into the floor suction plant. This allows no time for the vapors to mix with the air surrounding the device and to pollute it.

Regulations stipulate that the draining of vehicles can only be performed over oil-tight work surfaces with an oil separator. An oiltight design of the floor below the large work surface of the device according to the plans is very involved and cost intensive. This is particularly true when the floor has in addition an incline in the direction of the suction aperture of a floor suction plant. To avoid high investment costs, the device according to the plans consists of a low-cost metal basin (84). According to the plans, it essentially extends below a surface which, when seen from above, is bordered by the outer circumference of the device with open front work platforms (80,90). In order to allow the forklift to directly the front longitudinal strut (10), a rectangular recess can be made in the front area of the basin (84). The basin (84) consists of the basin floor (86) and straight walls (87). Because of the height of the walls (87) the basin volume can be adjusted to any amount. This offers valuable leeway with respect to future regulations.

For simple and safe monitoring of the integrity of the basin (84) it is placed on staff or pipe-like lengthening pieces (85) above the floor (92). The floor can be easily checked between the lengthening pieces for oil leaks.

By arranging the lengthening pieces (85) in decreasing height or at a slant, it is possible at low cost to incline the basin (84) toward the suction aperture of the floor suction plant.

The feet can stand up in the basin (84). In this case, the basin (84) must be supported where the foot attaches to avoid deformation or damage, respectively. To prevent the feet from slipping (30) to the side lateral strip-like gripping devices can be installed on the basin floor. According to the plans, tipping of the scaffold of the device can, for example, be avoided by attaching in the lower area of the foot (30) a horizontal notch which meshes with a protrusion of a gripping device on the basin floor. A strip-like arresting device with a cross-section in the shape of an L turned by 90° when seen from the side could, for example, prevent slipping to the side or tipping. In addition, the basin (84) itself should be anchored tightly to the floor (92) with brackets on the outside.

The following description pertains in essence also to prototypes where the foot (30) standing upright in the basin ends in a vertical pedestal element (89).

It is preferable if the feet (30) or the vertical pedestal elements (89) are not upright in the basin (84) but extend through it and are fastened to the floor (92). To this end, the basin has recesses (88) that are, when viewed from above, rectangular and adjusted to the cross-section of the feet (30) and/or the vertical pedestal elements (89) in a number corresponding to the number of feet. The recesses (88) are surrounded by high walls (87). In an especially good prototype, the basin bottom (86) lies in the horizontal pedestal plate. At a small vertical distance from the basin bottom (86) is a walkable, grid-like cover (93) held by supports (94).

To reduce the risk of stumbling, a ramp-like barrier (95) ought to be placed around the external circumference of the basin. The barrier contains a flank resting on the floor (92) which has a hook-like protrusion pointing straight downward at its upper end. The hook is meshed in the vertical high wall (87) of the basin (84) and provides a tight connection between the surround (95) and the basin (84). Another advantage of this barrier (95) is that it can be detached from its anchoring by a quick vertical uplift. To allow for checking the basin for leaks, easy access to the ground under the basin is provided.

To prevent fluids from entering the gap between the high edge of the recess (88) and the vertical pedestal element (89) of the foot (30), respectively, a cuff (96) can be attached around the lower part of the foot (30). It typically surrounds the upper and lower area. When seen from the top, the cross section of the upper part of the cuff (96) is slightly larger than the cross section of the foot (30).

The lower area widens enough so that it overtops the above mentioned gap. The lower end of the cuff (95) rests on a grate (93) and permits a vertical shift of the foot (30). When the foot (30), as shown in FIG. 11 is height adjustable with a vertical pedestal element, the cuff (96) has borings (100) that mesh with the bores (101) of the pedestal element (89). These bores (100) hold a locking pin (98).

To avoid letting liquid drain directly onto the surface of the foot (30) or fluid flow under the cuff, a surrounding collar is attached to the foot (30) whose upper area forms a seal on the foot (30) while its lower part is widened and at a distance from the foot so that it overtops the gap between the foot (30) and the cuff (96).

At least one gallows-like installation is attached to at least one of the work platforms (40,50,60,80,90). As a rule, two gallows-like installations (39) are placed on the two opposite lateral work platforms (50,60). The gallows-like installation can be rigid or swivelable around its high axis and overtop the respective work platform in the direction of the inner work area, especially the railing. Supply lines for pneumatic, hydraulic, or electric devices can be mounted on this gallows-like installation (39) and/or the feet (3)) and/or the longitudinal struts (10,11) and/or the diagonal struts. These include especially cutters, cutting grinders, impact wrenches, screw drivers and drills.

The swivelable gallows (30) has also a lifting device such as a winch which permits removal of, for example, the battery or the drained motorblock out of the vehicle.

At the above mentioned locations, especially at the gallows-like installation (30), several pressure hoses that are connected to the different fluid collection containers can be held at the ready. Thus the fluids in the cooling system and trunk area can be vacuumed out effortlessly. Preferably a high pressure air line at least is available at the gallows-like installation (39). With its help, a fluid suction device on the vehicle underside can be effectively supported and the draining time shortened. It also makes sense to provide a hose at the gallows-like installation (39) which carries a tensid containing cleansing liquid. Use of a tensid containing cleaning liquid permits the complete removal of oil residues that do not drain or cannot be vacuumed and which take up significant volume in the motor block.

Rigid or swivelable tool shelves are attached with a joint at the feet (30) as well as at the railings.

In the following, a process for dismantling vehicles and especially the draining of automotive fluids is described with the device according to the plans.

The sequence of the actual draining processes is chosen at random and can be changed as desired.

In lieu of all prototypes of the device according to the plans, the use of one prototype with two swivelable front work platforms (80,90) and a tank voiding module (on the left side as seen from the front) and a fluid catching module (on the right) is described.

The motor of the vehicle to be drained at front, the tank at the rear. First, the swivelable front work platforms (80,90) are pushed aside as far as possible. (If the front work platform is rigidly connected to the front longitudinal strut (10), the individual grate parts are divided from one another and swiveled downward or sideways).

Then, a forklift picks up a vehicle from its side. It depends on the location of the tank whether the rear of the vehicle faces to the right or to the left. If, as in this example, the tank voiding module is on the left side of the device according to the plans, a vehicle with a tank in the rear should be picked up and placed on the device according to the plans with its rear facing left. This is because only in this position will the tank be located above the tank voiding module. Vehicles with rear drive with a tank commonly placed in the front are preferably picked up and set upon the device according to the plans so that their rear faces right.

In this instance, the vehicle rear should overtop the fork on the left and the front overtop the fork on the right.

The forklift lifts the vehicle to a height slightly above that of the strip device (6,7) and drives, using the two strip devices as guiding aids in the middle up to the front longitudinal strut (10). Upon arrival, the forklift lowers the fork and places the vehicle completely or at least partially on the frame of the device according to the plans or on its widening struts, respectively, so that the front wheels are set between the two right threshold-shaped devices (8,9) and so that the vehicle is automatically aligned lengthwise. The vehicle tank is located in this instance above the tank voiding module in the left side.

When backing up the forklift, the strip devices (6,7) which mesh into the right front wheel and the right rear wheel of the vehicle, cause the vehicle to be stuck in the fork of the forklift and align the vehicle parallel to the longitudinal struts (10,11). It goes without saying that a crane or a trolley can be used for lifting and positioning the vehicle instead of a forklift. As the next step the front work platforms (80,90) are swiveled and locked. If the work platforms are rigidly attached to the front longitudinal strut (10), the railings (14,15) are raised up.

After connecting a mass clamp to the equipotential at a vehicle part with strong mass, the tank voiding module is aligned exactly horizontal and vertical. With the pointed cone drill (51), the tank is bored and the bore hole is widened at least a bit. The bore hole edges which were originally bent upward are now bent down with the hook device. The drained or vacuumed fuel is caught and, depending on the fuel type, fed through hoses (77) to separate containers.

After the tank is completely emptied, the tank drilling device is lowered again and moved out of the inner work area on a sliding frame. Now the tank can be removed with, preferably, pneumatic or hydraulic tools, especially a cutter.

In the meantime, the lifting cylinders (3) can be positioned in the bumper areas and lifted up until the wheels are accessible. All wheels can be quickly removed with preferably pneumatic impact wrenches. After removing the wheels, the shock absorbers can be drilled and the draining fluids collected in catch basins located in the rim area of the upper work platforms and transported through hoses (77) to a storage container in a separate room. Of course, the shock absorber fluid can also be emptied with the suction devices loaded in the upper work platform. If needed, the shock absorbers can be disassembled and brought to a recycling center either whole or in parts.

After removal of wheels and draining and/or removal of the shock absorbers, the lift cylinders are lowered again. Now the basin or funnel-like fluid receptacles (74) of the left and right fluid catching module are placed under the corresponding fluid outlet openings of the vehicle and opened. In this manner the motor oil, crankcase and steering oils and brake fluid and coolants can be drained. Instead of basin and funnel-like fluid catching devices (74) the appropriate suction devices can be used for the individual fluid outlet.

At the same time, fluids can be removed from above, for example in the motor compartment with the hose-type suction device attached to the gallows (39). This pertains especially to window washing fluid and coolants for the air conditioning.

After draining the vehicle, the front work platforms (80,90) are unlocked and swiveled aside. (With the rigid front work platform, the railing parts are unlocked and turned over).

After this, the drained and partially dismantled vehicle is removed from the device according to the plans and brought to further dismantling activities. It is understood that during the draining process, numerous additional dismantling activities can be performed on the device under the plans. For example, doors or fenders, the trunk and motor hood as well as the windows can be removed and placed in separate containers.

In conclusion, it should be stated that fluid draining devices based on gravity should be preferred over those that are operated by an electric motor, for example. The former cannot form sparks. Also, closed systems are preferred over those where fluid vapors could be released.

What is claimed is:

1. A device for dismantling vehicles comprising:

a rear and a front longitudinal strut arranged horizontally and parallel to each other for positioning the vehicle;

at least two lateral struts arranged horizontally and parallel to each other and at a right angle to the longitudinal struts, an end of each lateral strut being connected to a longitudinal strut;

at least four vertical feet attached to an underside of the longitudinal struts, the longitudinal and lateral struts and the feet defining a scaffold;

at least one fluid collecting device moveably mounted on the scaffold;

a rectangular, walkable rear work platform disposed parallel to and adjacent the rear longitudinal strut;

two rectangular, walkable lateral work platforms each disposed parallel to and adjacent a lateral strut;

a walkable front work platform comprising at least one rectangular segment moveably attached to the front longitudinal strut; and at least one ascent providing access to at least one of the walkable work platforms.

2. The device of claim 1, further comprising a vertical support mounted at each end of the front longitudinal strut, wherein the front work platform comprises a left and a right front work platform mounted on the vertical supports via pivot joints and outwardly swivelable.

3. The device of claim 2, further comprising an electric, hydraulic or pneumatic device working between the front longitudinal strut and the left and right front work platforms to swivel the front work platforms.

4. The device of claim 2, wherein each front work platform comprises a vertical support located on a corner thereof, and wherein the pivot joints comprise:
   at least two meshed fixed-pivot swivel brackets mounted on each of the vertical supports of the front longitudinal strut and the vertical supports of the front work platforms; and
   a vertically extending shaft passing through the fixed-pivot swivel brackets of a vertical support of the front longitudinal strut and a vertical support of a front work platform, thereby positively connecting the brackets.

5. The device of claim 2 further comprising:
   a tongue-shaped protrusion attached to an under side of a rear strut of each front work platform;
   a U-shaped bumper shoe attached to an underside of the front strut at a location corresponding to the tongue-shaped protrusions, the protrusions meshing positively in the bumper shoes when the front work platform is swivelled closed; and
   a locking mechanism for locking and unlocking the swivelable front work platforms.

6. The device of claim 1, wherein a distance between the parallel longitudinal struts substantially corresponds to an average vehicle wheel base width, the device further comprising:
   at least two threshold-like objects installed on an upper surface of each longitudinal strut for aligning the vehicle positioned on the longitudinal struts in its longitudinal direction, the threshold-like objects being placed at a predetermined distance from each other to affect the same wheel of the vehicle;
   a plurality of extension plates mounted on the longitudinal struts substantially at the position of wheels of the vehicle; and
   two substantially rectangular strip devices mounted substantially vertically on the upper surface of the front longitudinal strut, a longitudinal axis of the strip devices being parallel to and near a front upper edge thereof.

7. The device of claim 1, further comprising at least one lifting device on the longitudinal struts and/or the lateral struts.

8. The device of claim 7, wherein the lifting device is arranged in recesses of the longitudinal struts or the lateral struts.

9. The device of claim 1, further comprising a gallows-like device attached to at least one of the work platforms for holding a supply line and/or a winch-like lifting device.

10. The device of claim 9, wherein the fluid collecting device have at least one supply line directly provided via the scaffold and/or the gallows-like device.

11. The device of claim 1, wherein the vertical feet and the ascent are height adjustable.

12. The device of claim 11, wherein the device is placed on a floor, wherein each foot comprises:

a cylindrical section having a wall defining a hollow interior, the wall further defining two bores at equal height on two opposite sides of the wall;
a horizontal pedestal plate connected rigidly to the floor;
a substantially square vertical pedestal element attached to the horizontal pedestal plate and having smaller dimensions than the hollow interior, the vertical pedestal element defining a plurality of horizontal bores located at various heights, each vertical pedestal element extends into the interior of the cylindrical section;
wherein the cylindrical section is vertically moveable with respect to the pedestal element, the bores on the wall aligning with each of the horizontal bores of the vertical pedestal element when the cylindrical section moves vertically; and
a locking pin guided through the bores on the wall and one of the plurality of horizontal bores of the vertical pedestal element to arrest the foot.

13. The device of claim 1, wherein a segment of the rear work platform horizontally extends beyond at least one lateral work platform, and wherein an upper end of the ascent is attached to the extended segment of the rear work platform, and a longitudinal axis of the ascent runs parallel or at a right angle to the lateral strut.

14. The device of claim 1, wherein the walkable work platforms and the ascent are between 0.20 and 2.50 m wide, are surrounded by a railing, and have slip resistant surfaces as walking surfaces.

15. The device of claim 1 wherein the fluid collecting device comprises a fluid catching receptacle.

16. The device of claim 1 wherein the fluid collecting device comprises a fluid suction device.

17. The device of claim 1 wherein the fluid collecting device comprises a tank voiding device.

18. The device of claim 17, wherein the tank voiding device comprises:
   two horizontal guide tracks of equal length each mounted at one end on one of two adjacent feet at the same height and parallel to the longitudinal struts;
   two horizontal slide rods of equal length rigidly connected parallel to each other and movably mounted on the horizontal guide tracks at a right angle thereto;
   a movable sled resting on and moveable along the two slide rods;
   a lifting device mounted on the sled and moveable in the vertical direction;
   a tool mounted on the lifting device for opening the bottom of a tank of the vehicle positioned on the longitudinal struts;
   a substantially ring-shaped catching receptacle mounted on the lifting device below the tool and having an upper cuff collar for catching the fuel drained from the tank; and
   a hose connecting the receptacle to a fuel collection container.

19. The device of claim 1, wherein the fluid collecting device comprises:
   a U-shaped sliding frame comprising a lower and an upper horizontal guide track arranged parallel to each other and each attached to a foot at one end, and a vertical strut connecting the other ends of the upper and lower horizontal guide tracks;
   at least one first sliding rod attached vertically between the upper and lower horizontal guide tracks and laterally moveable along the guide tracks;

a first guide pipe slidably surrounding each first sliding rod;

a horizontal arm rigidly attached at one end to each first guide pipe;

a second guide pipe mounted vertically on another end of each arm and having a lock screw;

a second sliding rod extending vertically through each second guide pipe and vertically movable, the second sliding rod being arrested by the lock screw in the second guide pipe;

a fluid collecting module installed at an upper end of the second sliding rod; and a hose attached to the fluid collecting module for transporting the collected fluids;

wherein the arm defines a hose duct for running the hose toward the scaffold.

20. The device of claim 19 wherein the lower and upper horizontal guide track are rigidly attached to the foot.

21. The device of claim 19 wherein the lower and upper horizontal guide track are pivotally attached to the foot.

22. The device of claim 19 wherein the horizontal arm comprises at least two arm segments pivotally connected to one another via joints.

23. The device of claim 19 wherein the fluid collecting module is a receptacle having an upper, collar-like cuff for catching fluids.

24. The device of claim 19 wherein the fluid collecting module is a suction device having an upper collar-like cuff.

25. The device of claim 1, wherein the at least one fluid collecting device comprises a tank voiding device mounted on a lateral pair of feet and a fluid catching receptacle and/or a fluid suction device mounted on another lateral pair of feet.

26. The device of claim 25, wherein each fluid collecting device has a hose, each hose being led by the shortest path to the scaffold and running into it.

27. The device of claim 12 further comprising:

a basin having a basin floor and vertical side walls, the basin being installed below the scaffold at a distance from the floor by a plurality of parallel lengthening pieces and inclined by 0.0001° to 10° with respect to a horizontal plane, the basin further having recesses surrounded by vertical walls to accommodate lower portions of the feet;

a walkable cover mounted over the basin;

a ramp-like surrounding of the basin having a diagonally upward pointing flank resting on the floor and a vertically downward pointing hook-like protrusion at its upper end meshing positively in the vertical side walls of the basin; and a cuff seated on the walkable cover and loosely surrounding each foot, a lower part of the cuff being widened and surrounding the vertical wall of the recess of the basin, the cuff having a plurality of bores on opposite sides aligned with the horizontal bores of the vertical pedestal element for insertion of the locking pin.

28. The device of claim 27, wherein the basin has a dimension substantially the same as an external circumference of the scaffold viewed from above with the front work platforms swivelled open.

* * * * *